C. D. HALDEMAN.
FENCE GATE.
APPLICATION FILED SEPT. 26, 1907.

908,564.

Patented Jan. 5, 1909.

2 SHEETS—SHEET 1.

Witnesses.

Inventor.
C. D. Haldeman.

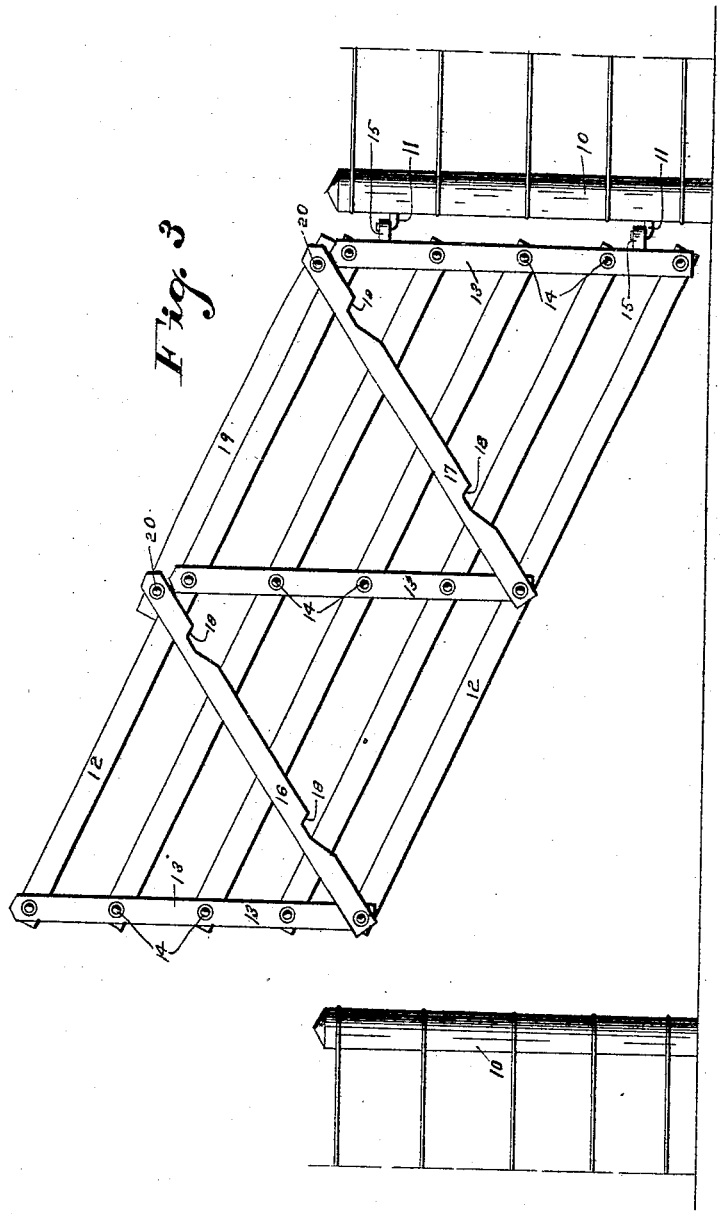

UNITED STATES PATENT OFFICE.

CHARLES D. HALDEMAN, OF MILO, IOWA.

FENCE-GATE.

No. 908,564.  Specification of Letters Patent.  Patented Jan. 5, 1909.

Application filed September 26, 1907. Serial No. 394,679.

*To all whom it may concern:*

Be it known that I, CHARLES D. HALDEMAN, a citizen of the United States, residing at Milo, in the county of Warren and State of Iowa, have invented a certain new and useful Fence-Gate, of which the following is a specification.

The object of my invention is to provide a fence gate of simple, durable and inexpensive construction, so arranged that its free end may be raised to any desired point of elevation, and there automatically held without interfering with the swinging movement of the gate.

My invention consists in certain details in the construction, arrangement and combination of the various parts of the device, whereby the objects contemplated are attained, as hereinafter more fully set forth, pointed out in my claim and illustrated in the accompanying drawings, in which—

Figure 1:
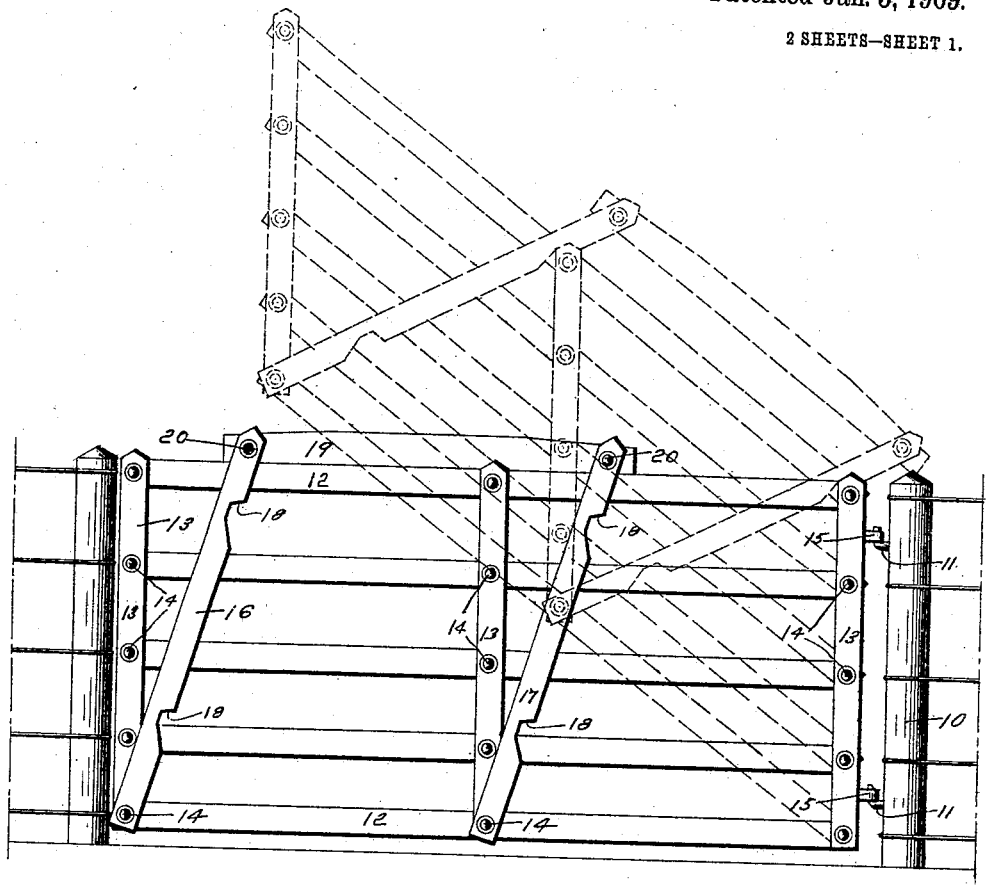
Figure 2:
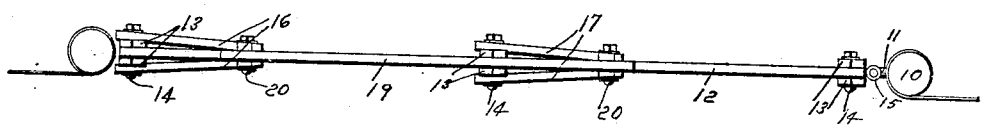

Figure 1 shows a side elevation of a gate embodying my invention, the dotted lines in said figure illustrating the gate in an elevated position, Fig. 2 shows a top or plan view of same, and Fig. 3 shows a side view of my gate in an elevated position.

Referring to the accompanying drawings, I have used the reference numeral 10 to indicate a gate post, and 11 the hinge members connected therewith. The gate proper is composed of a number of horizontal rails 12. At the ends and central portion of said horizontal rails are two upright gate members 13 connected with the rails 10 by bolts 14 to provide pivotal connection at said points. Attached to the upright gate members 13 at one end of the gate are the hinge members 15 to coact with the hinge members 11 on the gate post.

Pivotally connected with the lower bolts 14 of the free end of the gate are two bars 16 on opposite sides of the adjacent upright gate members, and pivoted to the lower bolt 14 of the central upright gate members are two similar bars 17 on opposite ends of the adjacent upright gate members. These bars are formed with notches 18 on their edges adjacent to the hinged end of the gate, for purposes hereinafter made clear. The two sets of bars 16 and 17 extend above the upper rail 12 and are connected with a bar 19 that normally rests on top of the upper rail 12. The bars 16, 17 and 19 are pivotally connected by means of the bolts 20.

In practical operation it will be noted that when the gate is in its horizontal position as shown in solid lines in Fig. 1, the upper and lower rails 12 will be separated to their maximum distance, and when the free end of the gate is being elevated, the upper and lower rails 12 will move toward each other, and the upper and lower rails 12 will be separated to their minimum distance when the rails 12 approach a vertical position. By means of the bar 19 on top of the upper rail and the bars 16 and 17, the free end of the gate will be prevented from sagging when in a horizontal position, as shown by solid lines in Fig. 1 because of the friction between the bar 19 and the top rail 12, which tends to hold the bars 16 and 17 in their inclined positions, as shown. I have found that even though the free end of the gate inclines downwardly, a slight distance, these bars will hold the gate from further downward movement. When it is desired to elevate the free end of the gate, the operator grasps it and raises it to the desired point of elevation. While doing this, the bar 19 will slide longitudinally of the top rail 12 on account of the weight of the bars 16 and 17 in a direction toward the hinged end of the gate, and when the operator releases the free end of the gate, the gate will retain its elevated position because the bar 19 and the bars 16 and 17 will prevent the rails of the gate from becoming further separated as is required when the gate moves from an elevated position toward a horizontal position. In some instances it is desired to raise the free end of the gate to a considerable height and for this reason I have provided the notches 18, so arranged that they will engage the tops of the upright gate members 13 at the hinged end of the gate, and the center of the gate, as shown in dotted lines in Fig. 1, where the upper notches in the bars 16 and 17 are engaged by the upright gate members. Obviously, if the free end of the gate were sufficiently elevated, the lower notches in the bars 16 and 17 would be brought into position in engagement with said upright gate members.

It will be seen that my improved gate is of very simple and inexpensive construction and may be made of materials which are usually found in every locality and no special skill or machinery is required in constructing the gate.

It is well known that the free ends of gates often sag or hang down after use, as the weight of the gate itself tends to incline the gate post. Ordinarily when this occurs, it is necessary for the operator to either adjust the hinges or else to readjust the gate post. In my improved device when the outer end of the gate sags from any cause whatever, the operator need only elevate it by hand, whereupon it will automatically retain said position. Furthermore, a very desirable feature in connection with my improved gate is that the operator may at any time lower the free end of the gate so that it may rest upon the ground, thus removing all strain from the gate post and hold the gate in position where the wind will not blow it about. This feature is quite desirable when the gate is in an open position because it may easily be held against closing by placing its free end upon the ground.

It is frequently desirable in connection with farm gates to support the free end in an elevated position so that comparatively small animals, such as sheep and swine may pass through the gate and larger animals, such as cattle and horses can be kept from passing through the gate-way. By the use of my improved gate, this may readily and easily be done. When the ground surface adjacent to the gate is obstructed, as for instance by a heavy fall of snow, the operator may then raise the free end of the gate high enough to clear the snow, thus avoiding the necessity of shoveling away the snow adjacent to the gate.

Having thus described my invention, what I claim and desire to secure by Letters Patent of the United States, therefor is—

An improved gate, comprising a number of parallel longitudinal rails, uprights at the ends and central portions of said rails, each upright consisting of two members on opposite sides of the rails, bolts for pivotally connecting the uprights and longitudinal rails, two pairs of bars pivotally connected with the bolts at the bottom of the gate that connect the lower rail with one of the end uprights and the central upright, the bars on each pair being arranged on opposite sides of the gate and extended upwardly and toward the end of the gate opposite from the end to which one of them is pivoted, said bars being spaced apart from the rails by means of the uprights, said pairs of bars being arranged parallel with each other, and a bar on top of the upper rail pivoted to said pairs of bars, and arranged between them, said parts being so arranged that the bar on the top of the upper rail will frictionally engage with the upper rail to such an extent as to hold the outer end of the gate against downward movement, and said parts being also so arranged that as the outer end of the gate is elevated the bar on top of the upper rail will remain in contact with the upper rail throughout a large portion of the upward movement of the outer end of the gate, and the gate will thereby be held in various positions of elevation without any other fastening device, said parts being also arranged so that the strain upon the bars that are connected with the upper bar will be distributed equally upon all of the longitudinal rails by means of said uprights.

CHARLES D. HALDEMAN.

Witnesses:
S. F. CHRISTY,
R. H. DECKER.